United States Patent [19]

Baldwin et al.

[11] 4,225,259
[45] Sep. 30, 1980

[54] PALLET COUPLER

[75] Inventors: Floyd G. Baldwin, Garden Grove; Kenneth D. McIntire, Norwalk, both of Calif.

[73] Assignee: McDonnell Douglas Corporation, Long Beach, Calif.

[21] Appl. No.: 12,377

[22] Filed: Feb. 15, 1979

[51] Int. Cl.³ .............................................. F16C 11/00
[52] U.S. Cl. ..................................... 403/62; 403/220; 403/407
[58] Field of Search ................ 248/346; 403/406, 407, 403/408, 62, 220; 213/75 R, 208

[56] References Cited

U.S. PATENT DOCUMENTS

| 1,060,430 | 4/1913 | Crecelius | 108/64 X |
| 1,520,518 | 12/1924 | Thomason | 108/64 |
| 1,732,648 | 10/1929 | Flintermann | 403/220 X |
| 2,296,782 | 9/1942 | Fischer et al. | 403/335 |
| 2,732,005 | 1/1956 | Corning | 403/220 X |
| 2,775,490 | 12/1956 | Hofrichter et al. | 108/51.1 X |
| 2,868,571 | 1/1959 | Owen | 403/220 |
| 3,231,040 | 1/1966 | Blanchette | 403/220 X |
| 3,643,603 | 2/1972 | King | 410/130 |
| 3,703,870 | 11/1972 | Walton | 108/50 |
| 3,857,342 | 12/1974 | Johns | 108/53 |
| 3,915,100 | 10/1975 | Sullivan | 108/64 |

Primary Examiner—William H. Schultz
Attorney, Agent, or Firm—John P. Scholl; Walter J. Jason; Donald L. Royer

[57] ABSTRACT

A coupler for use in joining cargo pallets by their attach rings. The coupler, normally used in pairs, provides for uniform spacing of joined pallets and bendability between pallets, permitting the joined pallets to traverse crests and valleys without putting concentrated loads on the coupler, the pallet, or cargo floor.

7 Claims, 5 Drawing Figures

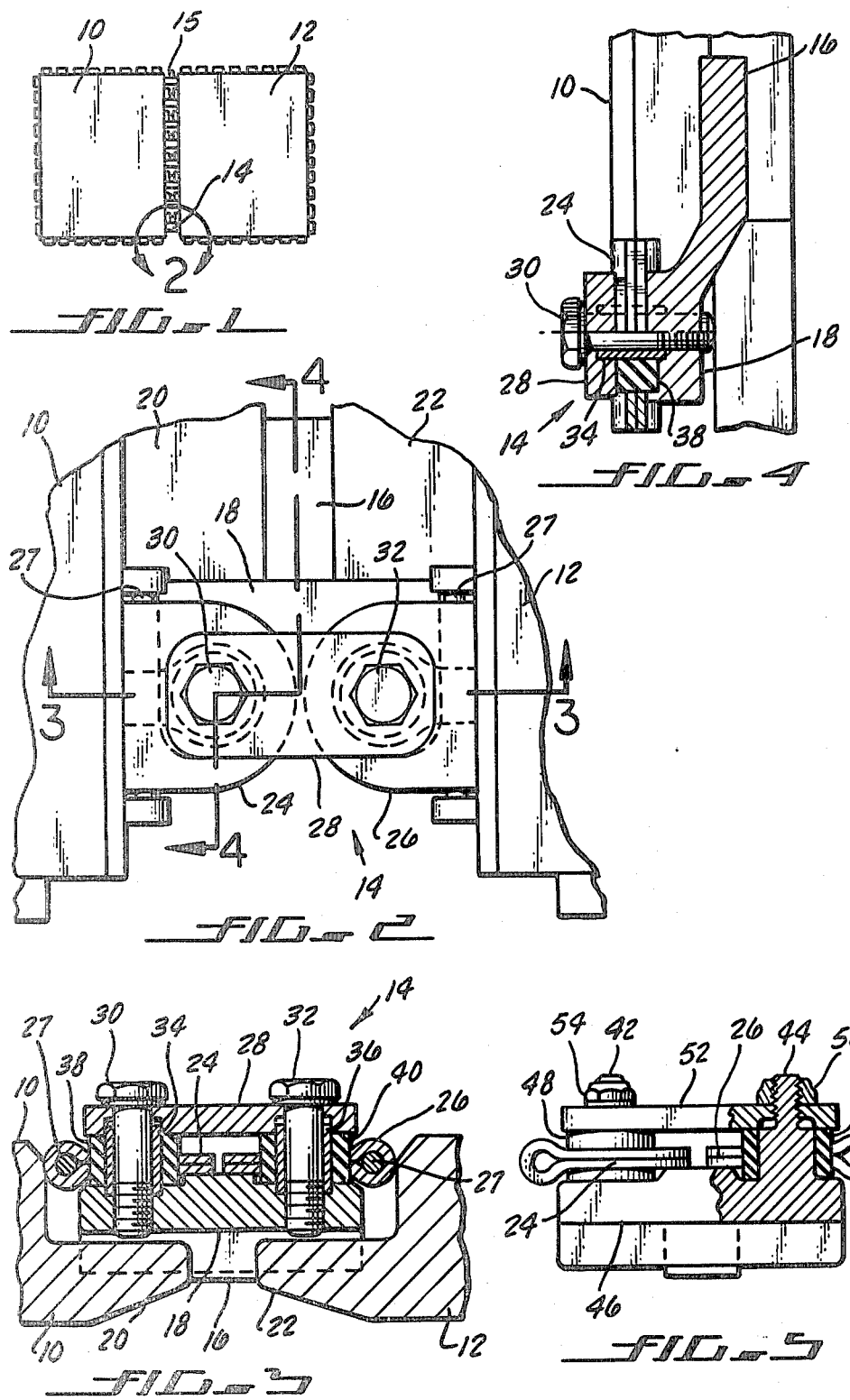

PALLET COUPLER

BACKGROUND

With the increase in airfreight, and the utilization of a variety of narrow and wide-bodied aircraft, a need has arisen to couple cargo pallets together for handling of cargo which is larger than can be carried by a single cargo pallet and for ease of loading and securing pallets to the cargo floor.

When two pallets are connected together, the connection should be designed, as simply as possible to hold the pallets in a spaced relationship for ease of securing the pallets to the floor of the aircraft and also permit the pallets to travel over crests and valleys in the loading and unloading process without placing concentrated loads on the pallet attachments, pallet structure or aircraft floor.

U.S. Pat. No. 3,703,870 discloses a cargo pallet coupler. This coupler appears to join the pallets into a specified configuration; however, a special fitting must be attached to the pallets to receive the coupler-rod and the attachment is only preserved by a friction fit.

SUMMARY OF THE INVENTION

The inventive coupler provides a means for interconnecting two cargo pallets by the standard attach rings. A spacer with parallel sides contacts the side flanges on the pallet and limits the distance between the pallets. It is desirable that joined pallets have a uniform spacing so that they will contact loading brackets on the floor of cargo aircraft. The cargo attach rings of the pallets are captured by a positive connection with the coupler. Elastomeric bushings surrounding the bolts holding the attach rings to the coupler are compressed and contact the inside of the cargo attach rings and provide a flexible joint between joined pallets. The flanges on the attached pallets pivot against the parallel sides of the spacer member and the bendability of the joint is controlled by the compression applied to the elastomeric collars. The parallel sides of the spacer portion of the coupler provides a lateral stability between the attached pallets. The inventive coupler keeps the pallets in a spaced relationship and the coupled pallets can traverse crests and valleys in the loading and unloading process.

BRIEF DESCRIPTION OF THE DRAWINGS

FIG. 1 shows two adjacent pallets interconnected by the inventive couplers;

FIG. 2 shows an enlarged top plan view of two pallets connected by the inventive coupler;

FIG. 3 shows a side elevation view along the line 3—3 of FIG. 2;

FIG. 4 shows a side elevation view along the line 4—4 of FIG. 2 wherein the attached bolt has been threaded into the coupler to a maximum depth; and FIG. 5 shows an alternative construction of the inventive coupler.

DESCRIPTION OF PREFERRED EMBODIMENT

Referring to FIGS. 1 and 2, pallets 10 and 12 are held by the inventive couplers 14 and 15. The inventive coupler 14 is comprised of spacer member 16 and an offset base member 18 (FIGS. 2 and 3). The spacer member 16 holds pallets 10 and 12 at a prescribed distance apart by contacting flanges 20 and 22 of pallets 10 and 12, respectively.

Standard cargo attach rings 24 and 26 are located on the edge of pallets 10 and 12 and mounted for rotational movement on pins 27. In FIGS. 2 and 3 attach rings 24 and 26 have been rotated to the horizontal position to overlie base member 18. Plate 28 overlies attach rings 24 and 26. Bolts 30 and 32 penetrate plate member 28, attach rings 24 and 26, and thread into base member 18.

Surrounding bolts 30 and 32 are sheer collars 34 and 36. Rubber bushings 38 and 40 surround sheer collars 34 and 36. When bolts 30 and 32 are threaded into base member 18, as shown in FIG. 4, rubber bushings 38 and 40 are compressed between plate member 28 and base member 18. Sheer collars 34 and 36 act as a stop to limit the threading of bolts 30 and 32 into base member 18 by setting the minimum distance between plate member 28 and base member 18.

When bolts 30 and 32 have been threaded to the maximum distance into base member 18, rubber bushings 38 and 40 are expanded circumferentially and are in compressive engagement with inside of attach rings 24 and 26. When bolts 30 and 32 are threaded to the correct depth into base member 18 and cargo attach rings 24 and 26 have been captured between plate member 28 and base 18 and spacer member 16 is positioned vertically as shown in FIG. 3 between flanges 20 and 22. During the loading operation flanges 20 and 22 pivot on edges of spacer member 16 and provide for bendability of the two attached pallets. The sheer collars 34 and 36 also provide a larger bearing surface of the rubber bushings, thus reducing the tendency to cut the rubber bushings when a shearload is imposed.

The spacer 16 provides a lateral stability between the joined pallets 10 and 12 as the pallets move over the crests and valleys of the loading and cargo floors.

The rubber bushings 38 and 40 provide for a flexible attachment between the coupler and the pallet cargo attach rings. This flexible attachment permits the joined pallets to bend with respect to each other while traveling crests and valleys in loading and unloading operations. Bending of the joined pallets permits a larger area of the pallets to contact loading platform or aircraft floor during transfer thereby move evenly distributing the load of the pallets.

In operation, to connect two pallets 10 and 12 with the inventive coupler 14, the two pallets are moved into close proximity and spacer member 16 is placed between flanges 20 and 22. Attach rings 24 and 26 are then rotated into position overlying base member 18. Bolts 30 and 32 are inserted into plate member 28 and sheer collars 34 and 36 are placed on bolts 30 and 32. Rubber or elastomeric bushings 38 and 40 are placed encircling sheer collars 34 and 36 and the entire assembly is placed on rings 24 and 26. Bolts 30 and 32 are threaded into base member and tightened, linking plate member 28 to the base member 18. As rubber bushings 38 and 40 are compressed between the plate member 28 and base member 18, the bushings expand circumferentially and firmly contact the inside of attach rings 24 and 26. This rubber interface between the attach rings and the sheer collars provides a limited flexibility to the joint between the coupled pallets and allows a limited bendability between the joined pallets.

In the preferred embodiments of the inventive coupler 14 shown in FIG. 3, bolts 30 and 32 are tightened until metal sheer collars 36 and 38 contact base member 18 and plate member 28. This limits the compressibility of rubber bushings 38 and 40 and controls the bendability of the joint between the coupled pallets.

FIG. 5 depicts an alternate construction of the inventive coupler 41. Bolts 30 and 32 of FIG. 2 have been replaced by upstanding studs 42 and 44 which are attached to base member 46. Rubber bushings 48 and 50 encircle studs 42 and 44, respectively. To join pallets with this alternative embodiment of inventive coupler 41, the cargo attach rings are rotated and placed around the rubber bushings 48 and 50. When plate member 52 is placed over studs 42 and 44, nuts 54 and 56 are used to secure plate member 52 in place. As nuts 54 and 56 are tightened, plate 52 compresses rubber bushings 48 and 50 against base 46. The compressed rubber bushings 48 and 50 expand circumferentially to contact the cargo attach rings 24 and 26. When the enlarged collar portion of studs 42 and 44 contact plate 52, they provide a stop and limit the minimum distance between plate 52 and base 46. By limiting the compressibility of rubber bushings 48 and 50, their circumferential expansion and the contact with the inside of attach rings 24 and 26 is controlled as is the amount of flexibility of the joint between the coupled pallets.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, since various other obvious modifications may occur to persons having ordinary skill in the art.

What is claimed is:

1. A coupler for interconnecting pallets by their attach rings comprising:
    a spacer with parallel sides to contact the flanges of said pallets, the sides of said spacer providing a pivotal surface for said flanges and lateral stability between the interconnected pallets;
    a base attached to and offset from said spacer to receive said attach rings;
    a plate to overlie said attach rings;
    connecting means to attach said plate to said base and capture said attach rings;
    elastomeric means located between said connecting means and said attach rings providing flexibility between joined pallets.

2. The coupler of claim 1 wherein said connecting means comprises two bolts which pass through said plate and attach rings and are threaded into said base.

3. The coupler of claim 2 wherein said elastomeric means comprises bushings which surround said bolts and contact the inside of said attach rings and are located between said plate and said base when the coupler is assembled.

4. The coupler of claim 3 including spacer means limiting the minimum distance between said base and said plate, and controlling the compressibility of said bushings.

5. The coupler of claim 1 wherein the connecting means comprises two studs attached to the base which pass through said attach rings and said plate and are held in said plate by nuts.

6. The coupler of claim 5 wherein the elastomeric means comprises bushings surrounding said studs and located between said base and said plate when the coupler is assembled.

7. The coupler of claim 6 having spacer means limiting the minimum distance between said base and said plate, and controlling the compressibility of said bushings.